(12) United States Patent
Whiteley

(10) Patent No.: US 9,005,339 B2
(45) Date of Patent: Apr. 14, 2015

(54) METHOD OF TREATING FLOWBACK FLUID

(71) Applicant: Cimarron Energy, Inc., Norman, OK (US)

(72) Inventor: James D. Whiteley, Grand Junction, CO (US)

(73) Assignee: Cimarron Energy, Inc., Norman, OK (US)

( * ) Notice: Subject to any disclaimer, the term of this patent is extended or adjusted under 35 U.S.C. 154(b) by 174 days.

(21) Appl. No.: 13/762,688

(22) Filed: Feb. 8, 2013

(65) Prior Publication Data

US 2013/0206404 A1 Aug. 15, 2013

Related U.S. Application Data

(60) Provisional application No. 61/597,539, filed on Feb. 10, 2012.

(51) Int. Cl.
*E21B 43/34* (2006.01)
(52) U.S. Cl.
CPC ........................................ *E21B 43/34* (2013.01)
(58) Field of Classification Search
CPC .................................................. B01D 19/0036
USPC ............... 95/247, 248, 249, 250, 253; 96/184
See application file for complete search history.

(56) References Cited

U.S. PATENT DOCUMENTS

| | | | | |
|---|---|---|---|---|
| 4,948,393 | A * | 8/1990 | Hodson et al. | 95/250 |
| 5,928,519 | A * | 7/1999 | Homan | 210/741 |
| 6,656,251 | B1 * | 12/2003 | Claesson et al. | 95/253 |
| 6,872,239 | B2 * | 3/2005 | Nilsen et al. | 95/30 |
| 8,518,159 | B2 * | 8/2013 | McCorriston et al. | 95/246 |
| 2003/0168391 | A1 * | 9/2003 | Tveiten | 210/188 |
| 2011/0174604 | A1 * | 7/2011 | Duesel et al. | 202/175 |
| 2012/0137883 | A1 * | 6/2012 | Bradley | 95/259 |

* cited by examiner

*Primary Examiner* — Duane Smith
*Assistant Examiner* — Cabrena Holecek
(74) *Attorney, Agent, or Firm* — Dunlap Codding, P.C.

(57) ABSTRACT

A method of treating flowback fluid comprising: introducing the flowback fluid into a first stage vertical separator to produce a first gas stream, a liquid stream, and a solids stream; passing the first gas stream from the first stage vertical separator to a sales line; passing the liquid stream from the first stage vertical separator to a second stage horizontal separator with the pressure in the second stage horizontal separator being less than the pressure in the first stage vertical separator but greater than atmospheric pressure to produce a second gas stream, a water stream; and a liquid hydrocarbon stream; passing the second gas stream from the second stage horizontal separator to a combustor or flare nozzle; passing the water stream from the second stage horizontal separator to a water storage tank; and passing the liquid hydrocarbon stream from the second stage horizontal separator to a liquid hydrocarbon storage tank.

6 Claims, 5 Drawing Sheets

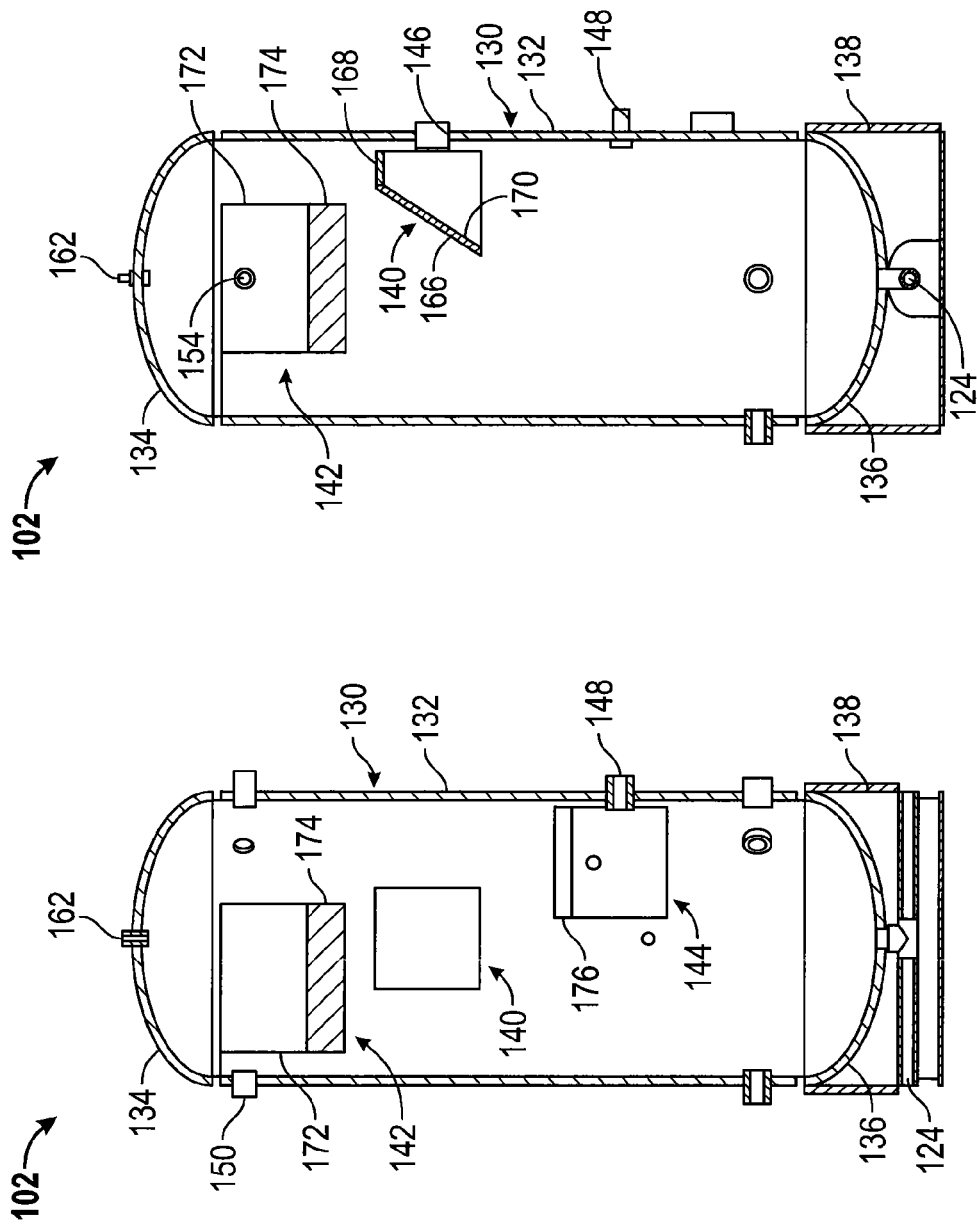

METHOD OF TREATING FLOWBACK FLUID

INCORPORATION BY REFERENCE

The entirety of U.S. provisional application Ser. No. 61/597,539 filed on Feb. 10, 2012, is hereby expressly incorporated herein by reference.

BACKGROUND

Shale gas production operations throughout the United States and all over the world increasingly rely on hydraulic fracturing as a completion process to stimulate natural gas production from shale formations. Hydraulic fracturing involves high-pressure injection of large quantities of water, along with sand and other small amounts of chemical additives, into a well. The high-pressure water creates small fractures, or cracks, in the surrounding rock formation, and sand or other propant used wedges into the cracks and prevents them from closing up once the water pressure is removed. These cracks allow any gas entrapped in the shale formation to escape and be recovered at the wellhead, and ultimately sold to consumers.

Upon completion of a hydraulic cracking process in a well, as a result of discontinuing the high-pressure water injection a large portion of the injected water (from several thousand to millions of gallons) is recovered at the wellhead as flowback water. Such flowback water typically contains liquid hydrocarbons, gases dissolved in the water due to the high-pressures in the well, other organic or non-organic components, and solids which may include the propant injected in the well, as well as sand/sediment, drill cuttings, and soil, washed up by the flowback water.

The gases dissolved in the flowback water as a result of the high pressures created during the hydraulic injection are highly flammable and pose serious environmental hazards. Hazardous air pollutants (HAP or HAPs) typically dissolved in or mixed with the flowback water comprise greenhouse gases, volatile organic compounds (VOC or VOCs), such as nitrogen oxides ($NO_x$), methane ($CH_4$), nitrous oxide ($N_2O$), carbon dioxide ($CO_2$), and liquid hydrocarbons, such as formaldehyde, benzene, and chlorofluorocarbons (CFCs). VOCs are organic chemicals that have a high vapor pressure at ambient conditions, and are especially problematic due to their tendency to readily dissolve in, or mix with, flowback water at high pressures, and to also readily evaporate from flowback water at atmospheric pressures and ambient temperatures. Further, most VOCs are generally not immediately toxic, but instead have compounding long-term health effects on oilfield personnel and other persons and animals exposed to even low concentrations of VOCs for prolonged periods of times.

Due to the health and environmental hazards of HAPs and VOCs, strict environmental laws and regulations have been enacted on the state (e.g., California Air Resources Board), federal (e.g., EPA, OSHA), and international levels, to minimize the emissions of HAPs, and VOCs in particular, into the environment during oilfield and other industrial and agricultural operations.

Conventional flowback water handling practice has been to flow wellstream fluids (e.g., flowback water) through a gas production unit or into a direct-fired production separator for a three-phase separation of the sales gas, the condensate/oil, and the flowback water at sales gas pressure. Conventional gas production units operate at pressures between 100-1400 psig and typically dump the exiting flowback water directly into atmospheric storage tanks after the sales gas has been separated.

Several problems are inherent in this approach, including inadequate retention times in the production separator and the flashing off of gas at the condensate and flowback atmospheric tanks resulting from the large pressure drop (e.g. from about 1400 psig to atmospheric pressure). Flash gases vented at flowback water and condensate storage tanks pose severe dangers of fires/explosions and environmental hazards of substantial amounts of HAPs emissions including VOCs.

To this end, a need exists for a method and separator assembly for treating large volumes of flowback fluid inherent in hydraulic fracturing operations without allowing substantial amounts of VOCs and HAPs to be emitted to the atmosphere. It is to such a method and separator assembly that the inventive concepts disclosed herein are directed.

BRIEF DESCRIPTION OF THE DRAWINGS

Like reference numerals in the figures represent and refer to the same or similar element or function. Implementations of the inventive concepts disclosed herein may be better understood when consideration is given to the following detailed description thereof. Such description makes reference to the annexed pictorial illustrations, schematics, graphs, drawings, and appendices. In the drawings:

FIG. 3 is a cross-sectional view of a first stage vertical separator.

FIG. 4 is a cross-sectional view of the first stage vertical separator.

DETAILED DESCRIPTION OF EXEMPLARY EMBODIMENTS

Figure 1:
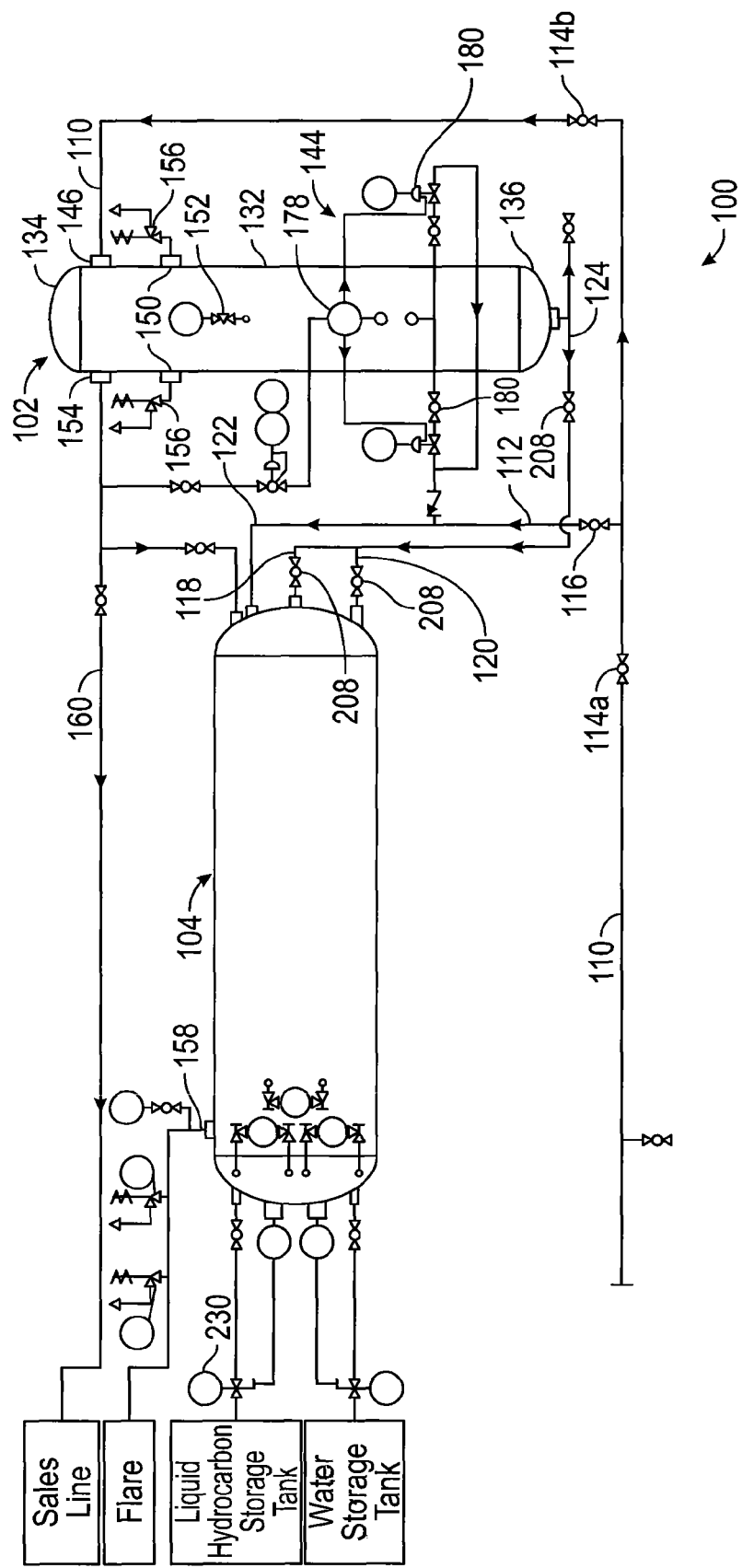
FIG. 1 is a schematic view of a separator assembly constructed in accordance with the inventive concepts disclosed herein.

The inventive concepts disclosed herein are generally directed to a separator assembly and more particularly, but not by way of limitation, to a mobile separator assembly configured to handle large volumes of flowback water and to carry out a three-stage separation process of gas, liquid, and solids from flowback fluids, without allowing substantial amounts of HAPs or VOCs to be emitted to the environment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 134a-n). Similarly, a letter following a reference numeral is intended to reference an embodiment of the feature or element that may be similar, but not necessarily identical, to a previously described element or feature bearing the same reference numeral (e.g., 148, 148a, 148b, etc.). Such shorthand notations are used for purposes of clarity and convenience only, and should not be construed to limit the instant inventive concepts in any way, unless expressly stated to the contrary.

As used herein the term "sales gas," and any variations thereof, is intended to include the gas, gases, or vapors, obtained from a well, which are not necessarily sold directly to consumers, but may be further processed (e.g., dehydrated or "sweetened"), used for fuel at the well site, flared or combusted, and combinations thereof, for example.

Further, unless expressly stated to the contrary, "or" refers to an inclusive "or" and not to an exclusive "or." For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
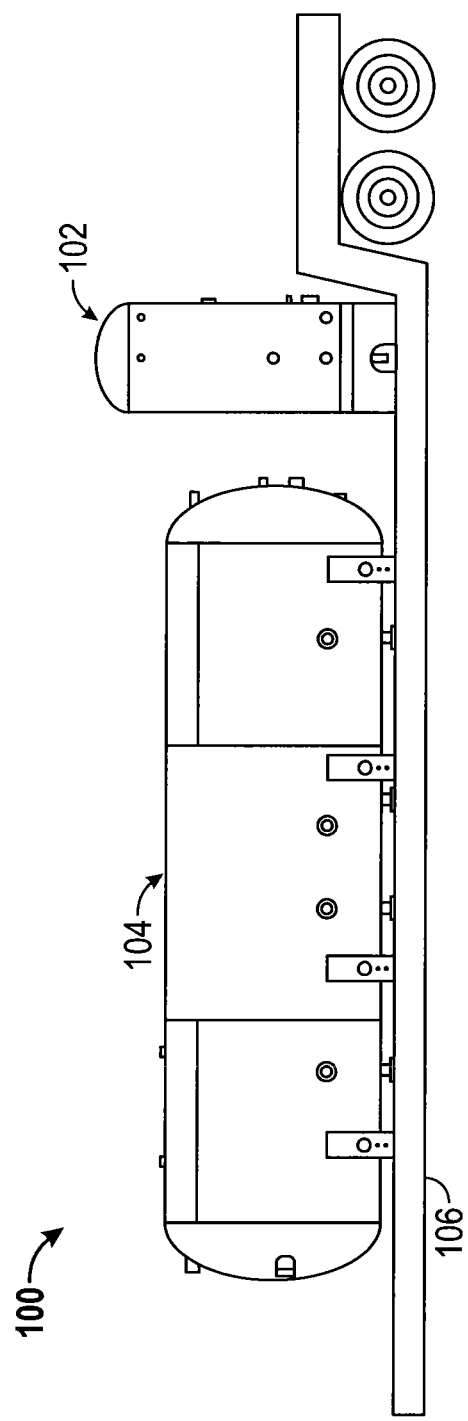
FIG. 2 is a side elevational view of the separator assembly of FIG. 1 shown with the piping removed for the sake of clarity.

Referring now to FIGS. 1-2, shown therein is an exemplary embodiment of a separator assembly 100 according to the inventive concepts disclosed herein. The separator assembly 100 may be referred to as "SA" hereinafter. The SA 100 is designed to handle large volumes of flowback water recovered from a well site upon hydraulic fracture completion. The SA 100 provides primary stage two-phase separation of solids, liquids, and sales gas at the sales gas pressure, and a secondary stage pressure reduction to a high-retention capable three-phase separation for condensate and flowback water stabilization and diversion of flash gases to a combustor or a flare. Flowback water, now devoid of much of the entrained gases and condensates, may be safely stored into storage tanks on site, or may be further processed, or otherwise disposed of.

The SA 100 comprises a first stage vertical separator 102 and a second stage horizontal separator 104, and may be designed to be moved from one well site to another via a trailer 106. While the SA 100 is shown as being mounted on a flatbed trailer 106, it is to be understood that the vertical separator 102 and the horizontal separator 104 may be mounted on separate trailers (not shown). Further the SA 100 may be transported with conventional means (e.g., trucks, trailers, etc.) and may be permanently or semi-permanently installed at a well site, for example. Further, the SA 100 may be mounted on a skid (not shown), or a railroad car (not shown), or may be loaded onto a truck and moved in variety of ways as will be understood by persons of ordinary skill in the art. The SA 100 may also be permanently or semi-permanently installed at any suitable location, such as a well site, an offshore rig, or an oil refinery, for example. The SA 100 may be disassembled for transport or storage, and may be transported and assembled at any desired location, as will be understood by persons of ordinary skill in the art having the benefit of the instant disclosure.

During the flowback stage of the hydraulic fracturing process, the SA 100 may be implemented to replace a conventional gas-processing unit, by being fluidly connected with the well such that wellstream fluids, or flowback fluid exiting the well, enter the SA 100. It is to be understood that a SA 100 according to the inventive concepts disclosed herein may be implemented during any stage of oil well drilling, oil production, gas well drilling, or gas production, and is particularly suitable for processing large volumes of fluid, such as the large volumes of fluid recovered from a well during the flowback stage of the hydraulic fracturing process, for example.

Generally, fluids are introduced into the first stage vertical separator 102 where the fluids are directed downward towards the bottom of the first stage vertical separator 102. The vertical separator 102 may be operated at the sales gas pressure. Sand, sediment, and liquids settle to the bottom of the vertical separator 102, while gases and vapors (i.e., sales gas), including natural gas, VOCs, and HAPs, rise upward towards the top of the vertical separator 102. Rising gases are passed from the first stage vertical separator in a pressure regulated manner via a gas line. The liquid level inside the vertical separator 102 is controlled by, for example, one or more control valves, and fluids are passed, in a pressure regulated manner, into the second stage horizontal separator 104.

The horizontal separator 104 is maintained at a suitable pressure above atmospheric pressure to prevent excessive flashing off of gases thereby maintaining more hydrocarbons in liquid form. Sand/sediment may be periodically blown off from the vertical separator 102 into the horizontal separator 104. By passing the sand/sediment to the horizontal separator 104, a significant portion of gaseous or liquid VOCs which are absorbed by the sand/sediment, or with which the sand/sediment came into contact, are removed from the sand/sediment, and captured for disposal.

Upon entering the horizontal separator 104, the fluids and the sand/sediment are directed downward towards the bottom of the horizontal separator 104. Once in the horizontal separator 104, the fluids flow over an internal weir system and the heavier sand/sediments settle on the bottom of the horizontal separator 104. Oil and other hydrocarbons are separated from water and stabilized, and flow into a separate oil chamber. The water passes to a separate water chamber. Any remaining entrained gases, HAPs, or VOCs rise toward the top of the horizontal separator 104 and are passed to a combustor or flare. The liquid hydrocarbons are passed to a hydrocarbon storage tank and the water is passed to a water storage tank.

Further, the sand/sediment, now devoid of much of the gaseous and liquid VOCs it came into contact or was contaminated with, may be removed from the horizontal separator 104 and disposed of in compliance with any applicable environmental regulations, for example.

The SA 100 includes a wellstream intake conduit 110. The intake conduit 110 is adapted to be connected to a well via suitable piping (not shown). The intake conduit 110 passes the well fluids to the first stage vertical separator 102. On one embodiment, the intake conduit 110 is connected to the vertical separator 102 at a location which about 75% of the height of the vertical separator 102 such that well stream fluids enter the vertical separator 102 at about 75% of its height. It is to be understood that such arrangement is only exemplary, and the intake conduit 110 may connect with the vertical separator 102 at any location, such as a top end, a bottom end, and along any portion of the sidewall of the vertical separator 102.

A bypass conduit 112 is in fluid communication with the intake conduit 110 and with the horizontal separator 104 via a fluid inlet. One or more valves 114 can be used to control the flow of fluids through the intake conduit 110. For example, a valve 114a can be operated to place the intake conduit 110 in fluid communication with a wellstream fluids source. Further, the valve 114a can be operated to remove the intake conduit 110 from fluid communication with a wellstream fluids source. Further, a valve 114b may be operated to allow fluids to flow through the intake conduit 110 and into the vertical separator 102, or may be operated to prevent fluids from entering the vertical separator 102 via the intake conduit 110. A valve 116 may be operated to allow fluids to flow into the horizontal separator 104 via the bypass conduit 112, or may be operated to prevent fluids from flowing into the horizontal separator 104 via the bypass conduit 112, for example.

The horizontal separator 104 is in fluid communication with the vertical separator 102 via an upper sand/sediment conduit 118, a lower sand/sediment conduit 120, and a fluid transfer conduit 122. The upper sand/sediment conduit 118 and the lower sand/sediment conduit 120 are in fluid communication with a sand blow-off conduit 124.

Referring now to FIGS. 3-4, the vertical separator 102 may be implemented as a high-pressure vertical separator 102. The vertical separator 102 comprises a high-pressure vessel 130 having a sidewall 132, a top end 134, and a bottom end 136. The high-pressure vessel 130 may be connected to the trailer 106 via a base flange 138, for example. The vertical separator 102 further comprises an impingement plate assembly 140, a mist extractor assembly 142, and a liquid level control assembly 144.

The high-pressure vessel 130 may be made of any suitable material capable of handling the pressure and abrasion likely to be encountered by the SA 100. For example, the high-pressure vessel 130 may be constructed of steel, stainless steel, aluminum, or other metals, or non-metals, and combinations thereof. In an exemplary embodiment, the sidewall 132 of the high-pressure vessel may comprise a 48" outer diameter and a 96" height, and may be rated for maximum allowable working pressure (MAWP) of about 1440 psig, and a working temperature range from about −12° Fahrenheit to about 200° Fahrenheit. In a non-limiting embodiment, the vertical separator 102 may have an estimated liquid handling capacity of 900 barrels a day with a 3-5 minute retention time, and a sales gas capacity varying from about 5 million standard cubic feet per day (MMSCFD) at 250 psig to about 33 MMSCFD at 1400 psig. The empty weight of the vertical separator 102 may be about 10,650 lbs., for example.

The vertical separator 102 has a fluid inlet 146, a fluid outlet 148, one or more pressure-relief openings 150, an optional pressure gauge 152 (FIG. 1), an optional cleanout access (not shown), and a gas outlet 154.

The fluid inlet 146 functions to allow fluids to enter the vertical separator 102. The fluid inlet 146 may be implemented as a three-inch Schedule Extra Heavy coupling, for example, or in any other suitable way, such that the fluid inlet 146 is in fluid communication with the intake conduit 110, and a substantially fluid-impermeable connection is formed between the fluid inlet 146 and the intake conduit 110. In an exemplary embodiment, the fluid inlet 146 is desirably positioned at about three-quarters (about 75%) of the height of the sidewall 132, such that fluids enter the vertical separator 102 at about three-quarters of the height of the sidewall 132. It is to be understood, however, that in some embodiments of the instant inventive concepts the vertical separator 102 may comprise more than one fluid inlet 146, and the fluid inlets 146 may be formed at any height on the sidewall 132, or in the top end 134 or the bottom end 136, and combinations thereof, for example.

The fluid outlet 148 may be implemented as a three-inch Schedule Extra Heavy coupling, for example. The fluid outlet 148 is in fluid communication with the fluid transfer conduit 122 (FIG. 1). The fluid outlet 148 may be formed at approximately 30% of the height of the sidewall 132, such that the level of fluids inside the vertical separator 102 can be maintained at about 30% of the volume of the vertical separator 102 by the liquid level control assembly 144, as will be described below, for example. It is to be understood that in some exemplary embodiments of the inventive concepts disclosed herein, the vertical separator 102 may comprise more than one fluid outlet 148. Further, the fluid outlet 148 according to the inventive concepts disclosed herein may be positioned at any height along the sidewall 132, may be formed into the top end 134, the bottom end 136, and combinations thereof, for example.

The one or more pressure-relief openings 150 may be operatively coupled to a pressure-relief valve 156 (FIG. 1), such that excess pressure may be released by the pressure-relief valve 156 when a predetermined threshold pressure is exceeded inside the vertical separator 102. To avoid releasing VOCs or other contaminants into the environment, such excess pressure may be released by allowing fluids or gases to escape the vertical separator 102, and enter the horizontal separator 104, for example. Alternatively, such excess pressure may be released by allowing fluids to escape the vertical separator 102 and enter a combustor/flare line 158, where the fluids may be safely disposed of by combusting or flaring, for example.

The optional pressure gauge 152 may be connected to the sidewall 132, and may be in fluid communication with the interior of the high-pressure vessel 130 such that the pressure gauge 152 may detect the pressure inside the high-pressure vessel 130 and display the detected pressure in a form perceivable by a user. The optional pressure gauge 152 may display the pressure inside the high-pressure vessel 130 locally, or may transmit the pressure to a remotely located control panel or system (not shown), and combinations thereof, for example.

The optional cleanout access may be implemented as a four-inch by eight-inch schedule extra heavy weld neck, for example. The cleanout access is desirably sealed in a fluid-impermeable way during the operation of the SA 100, and may be used to permit access, cleaning, or maintenance, of the interior and internal components of the vertical separator 102, as will be appreciated by persons of ordinary skill in the art having the benefit of the instant disclosure.

The gas outlet 154 functions to allow sales gas to be removed from the vertical separator 102 and conveyed into a sales gas line 160 (FIG. 1). The gas outlet 154 is desirably formed near the top of the sidewall 132, and is in fluid communication with the sales gas line 160.

The top end 134 may optionally comprise one or more ears (not referenced) adapted to allow a crane hook or a steel rope to be used to lift and move the vertical separator 102, for example. The top end 134 may further comprise a top end access 162, which may be implemented as a one-inch coupling, or in any other suitable manner, for example.

The bottom end 136 desirably comprises a sand blow-off conduit 124 formed therein, such that sand and sediment may be periodically blown off, or transferred, from the vertical separator 102 into the horizontal separator 104 via the sand blow-off conduit 124.

The sand blow-off conduit 124 may be implemented, for example, as a three-inch Schedule Extra Heavy pipe, or in any other suitable manner as will be understood by persons of ordinary skill in the art. Due to the high pressures in the well and in the vertical separator 102, some gaseous or liquid hydrocarbons or VOCs may come into contact with the sand/sediment that is carried into the vertical separator 102 by the flowback fluids. Such sand/sediment may be contaminated with VOCs, and such sand/sediments may remain contaminated inside the vertical separator 102, due to the high pressure therein, which prevents the VOCs from evaporating. Therefore, if such contaminated sand/sediment were to be removed directly from the vertical separator 102, any VOCs contained therein would be released into the environment. To avoid releasing such VOCs into the environment, the contaminated sand/sediment is transferred from the vertical separator 102, directly into the horizontal separator 104, where the contaminating VOCs may evaporate, bubble-off, or otherwise separate from the sand/sediment, and may be safely disposed of, such as by flaring, for example. Desirably, no contaminated sand/sediment from the vertical separator 102 is allowed to come into contact with the environment. Decontaminated sand/sediment is removed from the horizontal separator 104 as will be described below.

The base flange 138 may be implemented as a cylindrical base flange 138 used to attach the vertical separator 102 to the trailer 106 in a spaced apart vertical orientation, such that the sand blow-off conduit 124 can extend from the bottom end 136 of the vertical separator 102, for example. The base flange 138 may be attached to the vertical separator 102 and to the trailer 106, in any suitable manner, such as via welds, bolts, screws, joints, seams, adhesives, and combinations thereof, for example. The vertical separator 102 is mounted onto the trailer 106, such that the vertical separator 102 is substantially vertically oriented, and the bottom end 136 is adjacent to, or connected with, the trailer 106. It is to be understood that "substantially vertically" as used herein, is intended to mean that the vertical separator 102 is generally vertical relative to a generally horizontal top surface of the trailer 106. As will be understood by persons of ordinary skill in the art, substantially vertically encompasses deviations from a 90° angle between the trailer 106 and the vertical separator 102, due to the trailer 106 being positioned on uneven surfaces, natural topography variations, manufacturing tolerances, etc. Further, in some exemplary embodiments of the instant inventive concepts, the vertical separator 102 may be oriented in a variety of angles relative to the trailer 106, and such angles may range from 0°-180°. In other exemplary embodiments, the angle between the vertical separator 102 and the trailer 106 may be adjustable to ensure a generally vertical orientation of the vertical separator 102 relative to a horizontal top surface of the trailer 106 during operation of the SA 100.

The impingement plate assembly 140 is desirably at least partially disposed inside the high-pressure vessel 130, and is shown positioned over the fluid inlet 146, such that fluids entering the vertical separator 102 via the fluid inlet 146 impinge, or otherwise encounter, an impingement plate 166, and are deflected, or otherwise directed downward, toward the bottom end 136 of the vertical separator 102. It is to be understood that in exemplary embodiments comprising more than one fluid inlet 146, more than one impingement plate 166 may be implemented, or alternatively a single impingement plate 166 may be positioned over two or more fluid inlets 146 to intercept incoming fluids and direct them downwards into the vertical separator 102. The impingement plate 166 may comprise a horizontal portion 168 to prevent splashing of liquids upward, and an angled portion 170 to redirect fluids downward toward the bottom end 136. The impingement plate 166 may be constructed of any suitable material, but is desirably constructed from abrasion-resistant and corrosion-resistant material, such as steel, titanium, metals, non-metals, and combinations thereof, for example. Further, the impingement plate 166 may be uncoated, or may be coated with a variety of coatings, such as paints, corrosion-suppressing agents, abrasion-resistant coatings, and combinations thereof, for example. The impingement plate 166 may be connected to the sidewall 132 in any suitable manner, such as by welds, seams, rivets, bolts, brackets, flanges, screws, adhesives, and combinations thereof, for example. The design, placement, and implementation of the impingement plate assembly 140 may be based upon Gas Processing Suppliers Association separator design standards, as will be understood by a person of ordinary skill in the art having the benefit of the instant disclosure.

The mist extractor assembly 142 comprises a mist pad support 172 and a mist pad 174. The mist pad support 172 is attached to the sidewall 132 and is desirably positioned above the impingement plate 166, and below the gas outlet 154. The mist pad support 172 may be attached to the sidewall 132 in any suitable manner, such as welds, seams, adhesives, flanges, brackets, bolts, screws, rivets, and combinations thereof, for example. The mist pad support 172 functions to support the mist pad 174.

The mist pad 174 may be implemented as any conventional mist pad 174, and functions to absorb any mist, aerosolized liquids, or liquid droplets, while allowing gases to pass therethrough, such that gases may enter the gas line 160 substantially fee of liquids. The design, placement, and implementation of the mist extractor assembly 142 may be based upon Gas Processing Suppliers Association separator design standards, as will be understood by a person of ordinary skill in the art having the benefit of the instant disclosure, for example.

The liquid level control assembly 144 comprises a shroud 176 and a liquid level controller 178. The shroud 176 may be implemented as a shroud (e.g., a baffle), and may be attached to the sidewall 132 in any suitable manner, such as by welds, seams, adhesives, bolts, screws, rivets, and combinations thereof, for example. The shroud 176 is desirably implemented such that the shroud 176 is disposed above the liquid level controller 178, and substantially prevents fluids directed downwards by the impingement plate 166 from directly contacting the liquid level controller 178. The shroud 176 is shown as an L-shaped shroud 176, but it is to be understood that the shroud 176 may comprise and suitable shape capable of substantially preventing incoming fluids from directly contacting the liquid level controller 178 prior to reaching the bottom end 136 of the vertical separator 102, and allowing the sand and sediment carried by the fluids to settle at the bottom end 136.

The liquid level controller 178 (FIG. 1) may be implemented as a conventional liquid level controller 178, such as a mechanical float, for example, configured to maintain a preset level of liquid (desirably to about thirty percent of the volume of the vertical separator 102) into the vertical separator 102, and to transfer fluids into the horizontal separator 104 in a pressure-regulated manner. The transfer of fluids between the vertical separator 102 and the horizontal separator 104 is desirably driven by the pressure differential between the vertical separator 102 and the horizontal separator 104, for example. The liquid level controller 178 is in fluid communication with the fluid outlet 148. One or more dump valves 180 may be used to transfer fluids from the vertical separator 102 to the horizontal separator 104 as will be described below. The liquid level controller 178 design, placement, and implementation may be based upon Gas Processing Suppliers Association separator design standards, as will be understood by a person of ordinary skill in the art having the benefit of the instant disclosure, for example.

Figure 5:
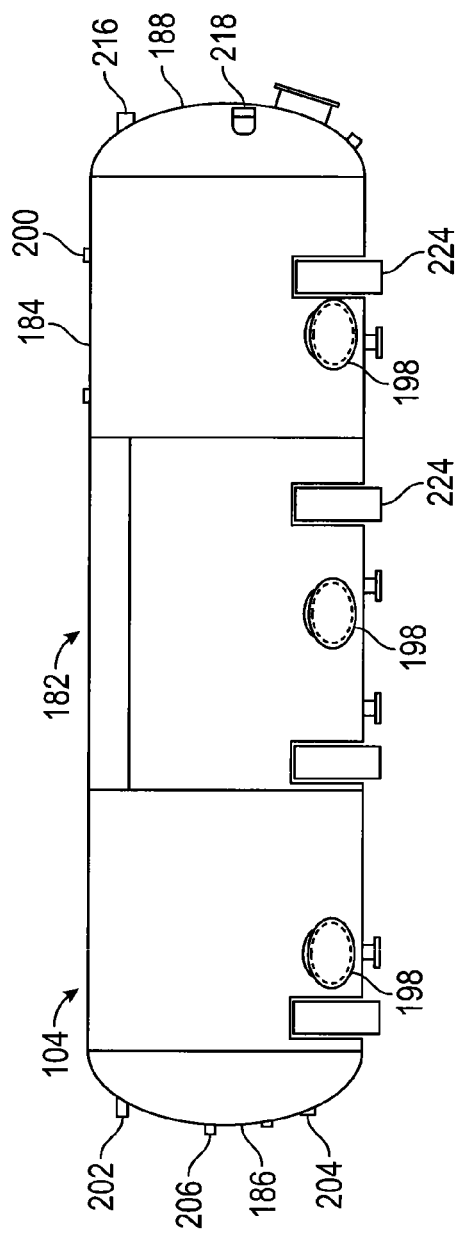
FIG. 5 is a side elevational view of an exemplary embodiment of a second stage horizontal separator.
Figure 6:
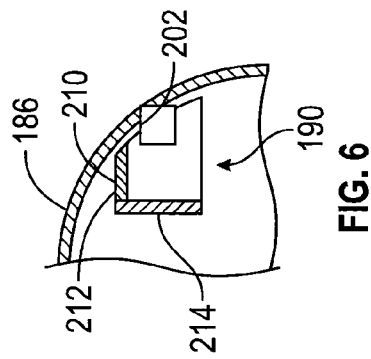
FIG. 6 is a detail cross-sectional view of a fluid inlet of the second stage horizontal separator of FIG. 5.

Referring now to FIGS. 5-6, the horizontal separator 104 may be implemented similarly to the vertical separator 102, and is in fluid communication with the vertical separator 102, as will be described herein below. The horizontal separator 104 comprises a low-pressure vessel 182 having a cylindrical sidewall 184, a rear end 186, and a front end 188. The horizontal separator 104 further comprises an impingement plate assembly 190 (FIG. 6), and an internal weir system 192 (FIGS. 7A-7D) defining a water chamber 194, and an oil chamber 196. In an exemplary embodiment, the horizontal separator 104 may be implemented as an American Society of Mechanical Engineers (ASME) certified horizontal three-stage separator vessel, which may have an external diameter of approximately ninety-six inches and may be approximately three-hundred inches long. The horizontal separator 104 may be rated for fifty psig MAWP, and may have a working temperature range from about −20° Fahrenheit to 200° Fahrenheit. The horizontal separator 104 may be constructed of steel, for example, and may have an exemplary empty weight of approximately 12,000 lbs., and may have an exemplary total liquid handling capability from approximately 4,500 barrels/day with a retention time of sixty minutes to 9,000 barrels/day with a retention time of thirty minutes. Desirably, the horizontal separator 104 design and implementation may be based upon Gas Processing Suppliers' Association (GPSA) separator design standards, for example.

The sidewall 184 may be implemented similarly to the sidewall 132 and may comprise one or more cleanout access 198, and a vapor/gas outlet 200.

The cleanout access 198 may be implemented as a four-inch by eight-inch schedule extra heavy weld neck, for example. The cleanout access 198 is desirably sealed in a fluid-impermeable way during the operation of the SA 100, and may be used to permit access, cleaning, and maintenance of the interior of the horizontal separator 104, as will be appreciated by persons of ordinary skill in the art.

The vapor/gas outlet 200 may be formed in a top portion of the sidewall 184, and may be in fluid communication with the combustor/flare line 158. The vapor/gas outlet 200 functions to remove any vapors and gases from the horizontal separator 104. The vapor/gas outlet 200 may be implemented as a four-inch raised-face slip on flange connected to the sidewall 184 in a fluid-impermeable manner, for example, or in any other suitable manner. The vapor/gas outlet 200 functions to allow and gases or vapors released inside the horizontal separator 104 to be safely disposed of, such as by combustion, or flaring, for example.

The rear end 186 may be implemented similarly to the bottom end 136 and may comprise a fluid inlet 202, a lower sand/sediment inlet 204, and an upper sand/sediment inlet 206. The rear end 186 is desirably connected to the sidewall 184 in a fluid-impermeable manner, such as by welds, bolts, screws, seams, joints, and combinations thereof, for example. It is to be understood that in some embodiments, the rear end 186, and the sidewall 184 may be formed as a unitary body.

The fluid inlet 202 may be implemented as a three-inch coupling, for example, or in any other suitable manner. The fluid inlet 202 is in fluid communication with the fluid outlet 148 of the vertical separator 102 via the fluid transfer conduit 122, and functions the allow fluids to be transferred from the vertical separator 102 into the horizontal separator 104, for example via one or more dump valves 180.

The lower sand/sediment inlet 204 and the upper sand/sediment inlet 206 are vertically offset and are in fluid communication with the sand blow-off conduit 124. The lower sand/sediment inlet 204 and the upper sand/sediment inlet 206 function to allow contaminated sand/sediment to be transferred from the vertical separator 102 into the horizontal separator 104, as will be described below. One or more valves 208, such as threaded ball valves, for example, may be used to selectively allow sand/sediment to enter the horizontal separator 104. In a non-limiting embodiment, sand/sediment may be initially transferred into the horizontal separator 104 via the lower sand/sediment inlet 204, and when a predetermined amount of sand/sediment has been transferred in this manner, further sand/sediment may be transferred via the upper sand/sediment inlet 206.

The impingement plate assembly 190 (FIG. 6) comprises an impingement plate 210 having a horizontal portion 212 and a vertical portion 214. The impingement plate 210 is desirably positioned over the fluid inlet 202, and over the lower sand/sediment inlet 204 and the upper sand/sediment inlet 206, such that the impingement plate 210 intercepts any incoming fluids and any incoming sand/sediment and direct such incoming fluids and sand/sediment downward toward the bottom of the horizontal separator 104.

The front end 188 may be implemented similarly to the top end 134 and may comprise a water outlet 216, and an oil outlet 218. The front end 188 is desirably connected to the sidewall 184 in a fluid-impermeable manner.

The water outlet 216 is in fluid communication with the water chamber 194, and functions to allow water to be removed from the horizontal separator 104. The water outlet 216 may be implemented as a three-inch coupling, for example, or in any other suitable manner.

The oil outlet 218 is in fluid communication with the oil chamber 196, and functions to allow oil to be removed from the horizontal separator 104. The oil outlet 218 may be implemented as a three-inch coupling, for example, or in any other suitable manner.

Figure 7A:
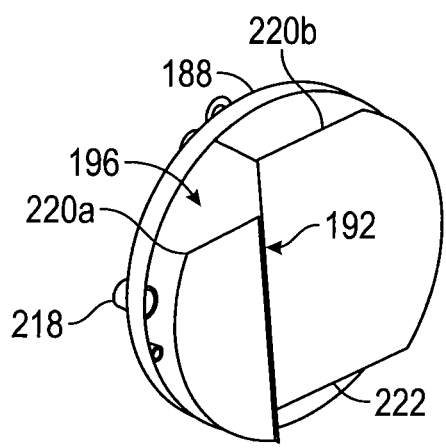
FIG. 7A is a perspective view of a weir system of the second stage horizontal separator.
Figure 7B:
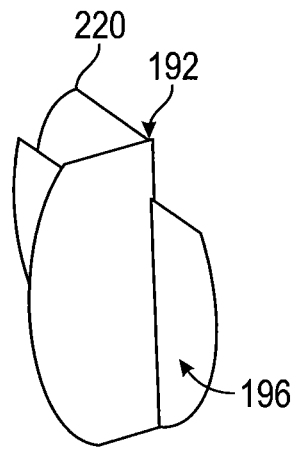
FIG. 7B is a perspective view of the weir system of FIG. 7A.
Figure 7C:
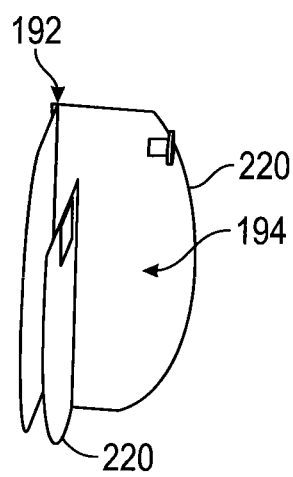
FIG. 7C is a perspective view of a water chamber of the second stage horizontal separator.

Referring now to FIGS. 7A-7D, the internal weir system 192 comprises one or more weirs 220, positioned such that the weirs 220 define the water chamber 194 and the oil chamber 196. As can be seen in FIG. 7A, a weir 220*a* defining the oil chamber 196 has a height over which oil can flow into the oil chamber 196. The weir 220*b* defining the water chamber 194 has a bottom opening 222, which allows water to flow into the water chamber 194. The weirs 220 may be implemented as any conventional weirs 220, as will be understood by a person of ordinary skill in the art having the benefit of the instant disclosure. The water chamber 194 and the oil chamber 196 are desirably mechanically level controlled and in fluid communication with the water outlet 216 and the oil outlet 218, respectively.

Figure 7D:
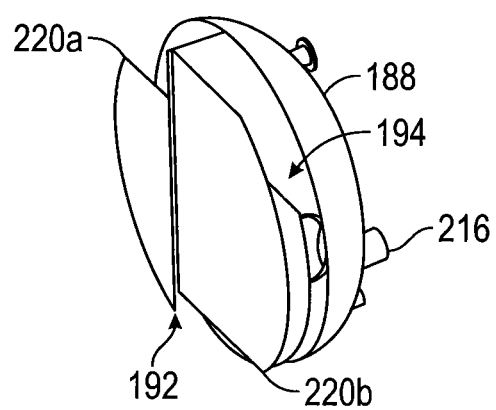
FIG. 7D is a perspective view of the weir system of FIG. 7A rotated 90°.

The weirs 220 may be connected to the sidewall 184 and the front end 188, so that the weirs 220 cooperate with the sidewall 184 and with the front end 188 to define the water chamber 194 and the oil chamber 196 as shown in FIGS. 7A and 7D, in some exemplary embodiments.

The horizontal separator 104 may be mounted onto the trailer 106 via one or more optional bases 224 (FIG. 5), such that the horizontal separator 104 is securely attached to the trailer 106. It is to be understood that while such bases 224 are shown as substantially C-shaped bases 224, the bases 224 may be any conventional bases 224. Further, in some exemplary embodiments, the bases 224 may be omitted, or may be formed as a unitary body with the trailer 106 or with the horizontal separator 104, as will be understood by persons of ordinary skill in the art.

In operation, the SA 100 is used as follows. Flowback fluid from the wellhead is introduced into the first stage vertical separator 102 via the intake conduit 110. The incoming fluid encounters the impingement plate 166, which causes heavier solids and liquids to settle to the bottom of the vertical separator 102. The gas or vapor components of the wellstream fluids migrate upwardly through the mist extractor assembly 142, and pass from the vertical separator 102 to the sales gas line 160.

Collected solids may be manually removed from the vertical separator 102 at the bottom of the vertical separator 102, such as by periodically operating one or more valves 208, which cause a solids stream to be blown into the horizontal separator 104 via the upper sand/sediment conduit 118 and the lower sand/sediment conduit 120. The lower sand/sediment conduit 120 transfers the solids stream into the horizontal separator 104 at a first height of the rear end 186, and the upper sand/sediment conduit 118 transfers sand and sediment into the horizontal separator 104 at a second height or the rear end 186, which is greater than the first height, for example. The sand and sediment may be transferred into the horizontal separator 104 via the lower sand/sediment conduit 120 by operating the valve 208, until a layer of sand/sediment builds up in the horizontal separator 104 to the first height. Then, sand/sediment may continue to be transferred into the horizontal separator 104 via the upper sand/sediment conduit 118 by the closing the valve 208 and the opening a valve 208, for example. As will be understood, valves 208 may be operated to allow sand/sediment to be transferred into the horizontal separator 104 via the sand/sediment lower conduit 120 and the upper sand/sediment conduit 118, one at a time in any order, or via both the upper sand/sediment conduit 118 and the lower sand/sediment conduit 120 simultaneously. Further, in some embodiments, only one sand/sediment conduit 118 or 120, or more than two sand/sediment conduits 118 or 120 may be used to transfer sand/sediment from the vertical separator 102 to the horizontal separator 104. Desirably, no VOCs or HAPs are allowed to escape the SA 100 during the transfer of sand/sediment from the vertical separator 102 to the horizontal separator 104. The sand/sediment may be periodically removed from the horizontal separator 104 via the cleanout access 198, for example.

The liquid stream is level controlled in the vertical separator 102 via the liquid level controller 178, and flows through the selective operation of one or more dump valves 180 into the horizontal separator 104 for further separation.

The horizontal separator 104 is maintained at a lower pressure and serves as the condensate and water stabilization vessel. Inlet liquids undergo the Joules-Thompson effect through the first separator dumps, and encounter the impingement plate assembly 190 upon entering the horizontal separator 104 via the fluid inlet 202. The large size of the horizontal separator 104 provides the necessary retention times for proper disengagement of gas entrained in the liquid stream. The horizontal separator 104 liquid retention volume also provides retention period for the gravitational/settling separation of condensate/oil from the flowback liquids. The water stream collected in the water chamber is passed to the water storage tank. Condensate enters a separate oil chamber 196 after spilling over the internal weir system 192, and is mechanically level controlled through its own dump valve 230 to the liquid hydrocarbon storage tank. Entrained vapor released in the horizontal separator 104 is passed to the combustor or flare.

The bypass conduit 112 may be used to bypass the vertical separator 102 and to direct the fluids coming from the well directly into the horizontal separator 104 such as by opening the valve 116. The bypass conduit 112 may be implemented to avoid the release of VOCs into the environment, such as during emergencies, excess pressures in the well, pressure-leaks, pressure-losses, or other malfunctions in the vertical separator 102, for example.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein and defined by the appended claims.

What is claimed is:

1. A method of treating a flowback fluid during a flowback stage of a well operation, comprising:
    introducing the flowback fluid into a first stage vertical separator to produce a first gas stream, a liquid stream, and a solids stream;
    passing the first gas stream from the first stage vertical separator to a sales gas line;
    passing the liquid stream from the first stage vertical separator to a second stage horizontal separator with the pressure in the second stage horizontal separator being less than the pressure in the first stage vertical separator but greater than atmospheric pressure to produce a second gas stream, a water stream; and a liquid hydrocarbon stream;
    passing the second gas stream from the second stage horizontal separator to a combustor or flare nozzle;
    passing the water stream from the second stage horizontal separator to a water storage tank; and
    passing the liquid hydrocarbon stream from the second stage horizontal separator to a liquid hydrocarbon storage tank.

2. The method of claim 1, further comprising the step of passing the solids stream from the first stage vertical separator to the second stage horizontal separator.

3. The method of claim 1, wherein the second stage separator has a liquid handling capability of about 4,500 barrels per day with a retention time of about 60 minutes.

4. The method of claim 1, wherein the second stage separator has a liquid handling capability of about 9,000 barrels per day with a retention time of about 30 minutes.

5. The method of claim 1, wherein the first stage separator has a liquid capacity of about 900 barrels per day with a retention time of between about 3 minutes and about 5 minutes.

6. The method of claim 5, wherein the first stage separator has a gas capacity of about 5 million standard cubic feet per day.

* * * * *